United States Patent [19]

Armstrong et al.

[11] 4,218,358

[45] Aug. 19, 1980

[54] PROCESS FOR REMOVING UNREACTED MONOMERS FROM POLYMERIZATION SLURRIES

[75] Inventors: Arthur A. Armstrong, Cary, N.C.; Gerd R. Baur, Decatur, Ala.; Charles N. Carpenter, St. Louis; Edwin W. Folk, Manchester, both of Mo.; Donald J. Stookey, Raleigh, N.C.; Robert L. Voges, Muscatine, Iowa

[73] Assignee: Monsanto Company, Decatur, Ala.

[21] Appl. No.: 894,788

[22] Filed: Apr. 10, 1978

[51] Int. Cl.$^2$ ............................ C08K 5/17; C08K 5/41
[52] U.S. Cl. ...................... 260/32.6 N; 260/30.8 DS; 528/487; 528/492
[58] Field of Search ............................... 528/487, 492; 260/30.8 DS, 32.6 N

[56] References Cited

U.S. PATENT DOCUMENTS

| | | | |
|---|---|---|---|
| 3,634,300 | 1/1972 | Fischer et al. | 260/32.6 N |
| 3,960,666 | 6/1976 | Melacini et al. | 260/32.6 N |

*Primary Examiner*—Stanford M. Levin

*Attorney, Agent, or Firm*—Robert L. Broad, Jr.

[57] ABSTRACT

The method of recovering unreacted mono-olefinic monomers from an acrylonitrile polymerization slurry containing 30 to 50 weight percent of polymer solids and 70 to 50 weight percent of unreacted monomers wherein the slurry is first diluted with a solvent for the polymer and then fed in series through first and second treatment zones, with each of the treatment zones having a first stage for mixing the slurry with a solvent in vapor form to vaporize some of the unreacted monomers from the slurry and form a polymer solution and a second stage for separating monomer vapors from the liquid polymer solution. Fresh solvent, in vapor form and at an elevated temperature is supplied to the mixing stage of the second treatment zone and the vaporized solvent and unreacted monomers from the separation stage of the second treatment zone are fed to the mixing stage of the first treatment zone. The preferred ratio of solvent to slurry being fed to the mixing stages is 0.8 to 1.2. The polymer solution leaving the separation stage of the second treatment zone has a very low content of unreacted monomers.

5 Claims, 2 Drawing Figures

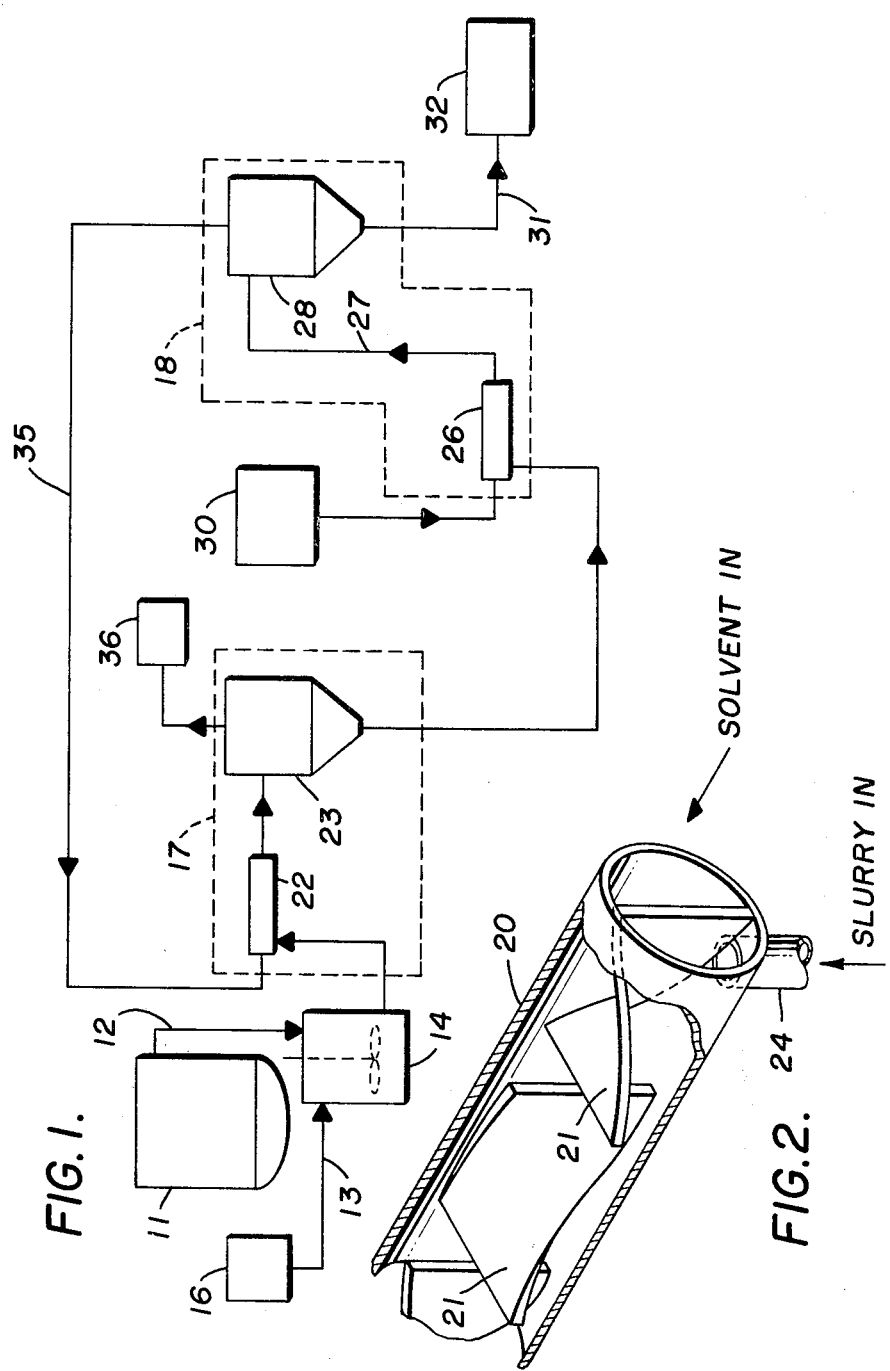

PROCESS FOR REMOVING UNREACTED MONOMERS FROM POLYMERIZATION SLURRIES

BACKGROUND OF THE INVENTION a. Field of the Invention

This invention relates to methods for removing unreacted monomers from acrylic bulk polymerization slurries.

b. Description of the Prior Art

Acrylic polymers are conventionally manufactured by a suspension polymerization process, with the polymer solids subsequently being removed from the polymerization slurry by a filtration process. The polymers are then washed with water to remove unreacted monomers and are then dried. This process has the disadvantage that the polymer must be dried.

In one prior art method of removing unreacted monomers from a polymerization slurry, the slurry is allowed to cascade down a baffle type stripping column while steam is fed upward through the column, countercurrent to the cascading slurry. Pluggage and fouling are reduced in this process but contact between the slurry and the steam is not as good as desired, resulting in reduced monomer stripping.

In the present invention neither water or steam is used, the slurry being contacted with heated solvent vapors to remove unreacted monomers. Mixers are used to insure good slurry solvent contact and the slurry is circulated through two mixing and separating stages in a particular manner to remove substantially all of the unreacted monomers. Polymer solutions from this process may be fed directly to a spinning machine without further treatment.

SUMMARY OF THE INVENTION

In the process of the present invention a bulk polymerization slurry containing 30 to 50 weight percent of polymer solids and 70 to 50 weight percent of unreacted monoolefinic monomers is diluted with a solvent to reduce the solids content of the diluted slurry to 20 to 25 weight percent. The diluted slurry is then passed through first and second treatment zones, each of the treatment zones having a first stage for mixing the slurry with solvent in vapor form and a second stage for separating vapors from the liquid polymer solution. A fresh solvent for the polymer, in vapor form and at an elevated temperature, is fed to the mixing stage of the second treatment zone to strip unreacted monomers from the polymer solution to an acceptable level. The vaporized unreacted monomers and that portion of the solvent which remains in vapor form are withdrawn from the separation stage of the second treatment zone and fed to the mixing stage of the first treatment zone. Some of the solvent fed to the mixing stages will be condensed to a liquid, while the remainder will be taken off as a vapor. Vaporization of the unreacted monomers and condensation of the solvent is such that the polymer solution leaving the first treatment zone will be made up of less than 5 weight percent unreacted monomers, 20-25 weight percent polymer and 73-78 weight percent solvent. The polymer solution leaving the second treatment zone will be made up of about 20-25 percent polymer and about 75-80 weight percent solvent, with there being less than about 0.1. weight percent of unreacted monomers remaining in the solution at this point. With an unreacted monomer content this low, the solution can be fed directly to a spinning machine without further treatment.

DESCRIPTION OF THE DRAWING

FIG. 1 of the drawing schematically shows apparatus useful in carrying out the process of the present invention.

FIG. 2 discloses apparatus useful in carrying out the mixing required by the process of the present invention.

DETAILED DESCRIPTION OF THE INVENTION

Referring now in detail to the drawing there is shown a bulk polymerization reactor 11 in which acrylonitrile (AN) is polymerized in a conventional manner. Other mono-olefinic monomers may be present in the reactor and copolymerized with acrylonitrile. Other mono-olefinic monomers which are copolymerizable with acrylonitrile are well known to those skilled in the art. Preferably, the polymers of the present invention will contain at least 35 weight percent acrylonitrile.

A polymerization slurry is withdrawn from the reactor 11 through a line 12 into a stirred slurry tank 14. This slurry will contain about 30 to 50 weight percent of polymer solids, with the remainder being unreacted monomers and very minor amounts of catalysts and other additives. A line 13 leading from a supply 16 feeds a liquid solvent for the polymer into the tank 14 to dilute the polymerization slurry to a solids content of about 20-25 weight percent in the slurry tank. Solvents such as dimethylacetamide (DMAC), dimethylformamide (DMF) and dimethylsulfoxide (DMSO) may be used. The preferred solvent is dimethylacetamide. If desired, the tank 14 may be heated to raise the temperature of the diluted slurry.

The diluted slurry is fed through first and second treatment zones 17 and 18 in series. Each of the treatment zones of stripping units 17 and 18 has a first stage which is a mixing stage and a second stage which is a separating stage. The mixing stages are made up of mixers of a known type such as that illustrated in FIG. 2. A mixer of this type is made up of a length of pipe 20 having secured therein a series of helical vanes 21 which cause the material flowing through the pipe to flow through pipe along a helical path which reverses direction at each of the vanes 21. The slurry flows radially into the mixer through an inlet tube 24, while the solvent vapor enters the mixer axially.

The separating stage of each of the treatment zones 17 and 18 comprises a known separator, such as a cyclone separator, for separating vapors from liquids.

The diluted slurry will flow first to the mixer 22 of the first treatment zone 17 where the slurry is mixed with a solvent in vapor form and at a temperature of 115°-150° C. to vaporize off some of the unreacted monomers in the slurry, with some of the solvent being condensed. The condensed solvent will further dissolve the polymer, with some being left in solid form. Most of the unreacted monomers will be separated from the slurry in a cyclone separator 23 making up the second stage of the first treatment zone and will be collected in a monomer recovery unit 36 for further use. The remaining polymer solution is taken off the bottom of the separator 23 and fed through a mixer 26 and a separator 28 of the second treatment zone 18. The solution fed from the separator 23 to the mixer 26 will consist of about 20-25 weight percent of polymer in solvent, with less than about 5 weight percent unreacted monomers.

Fresh solvent, of the type discussed above, from a source 30 is fed axially into the mixer 26 to be mixed with the solution. This solvent is in vapor form and at a temperature of 115 to 150° C. The solvent at this temperature will vaporize off substantially all of the remaining unreacted monomers in the polymer solution and these vapors will be separated from the polymer solution by the separator 28. The solvent will also complete the dissolving of the polymer.

The polymer solution or spin dope leaving the bottom of the separator 28 is about 20-25 weight percent polymer dissolved in about 75-80 weight percent of the solvent and is carried off through a line 31 to a spinning machine 32. The polymer solution at this point will contain less than 1.0 weight percent unreacted monomers and will usually contain less than about 0.1 weight percent of unreacted monomers, so that it can be fed to the spinning machine 32 without further treatment.

The vapors from the separator 28 are fed through a line 35 to the mixer 22 of the first treatment zone 17. Vapors separated from the solution by the separator 23 are fed to the monomer recovery unit 36 which may be a distillation column of a well known type.

The pressure in separator 23 is maintained at 50-150 mm Hg abs. The pressure drop ($\Delta P$) through the vapor line from the separator 28 to the mixer 22 and through the mixer 22 to the separator 23 is about 50-75 mm H. The pressure in separator 28 is maintained at about 100-225 mm Hg.

The amount of solvent vapor fed from the source 30 to the mixer 26 will be equal in weight to the weight of the slurry entering the mixer 22. The amount of solvent vapor used will preferably be 80-120 weight percent, based on slurry weight. Greater amounts of solvent, up to four to five times the amount of slurry, may be used. However, this is less economical.

COMPARATIVE EXAMPLE I

A slurry was mixed to simulate a polymerization slurry from a bulk polymerization process having an initial polymer solids content of 40 weight percent and which had been diluted to a solids content of about 25 weight percent by the addition of DMAC. This was achieved by mixing together 375 grams of a copolymer of 93 weight percent acrylonitrile and 7 weight percent vinyl acetate, 562.5 grams of monomeric acrylonitrile and 562.5 grams of DMAC. The slurry was heated to 50° C. and then passed through a mixer of the type described above, where it was contacted by solvent vapor fed at an elevated temperature and at varying rates and then fed into a cyclone separator operating at a pressure of 100 mm Hg absolute. Only one mixer and one separator stage were used in this example. The results of three runs stage were used in this example. The results of three runs as shown in Table A.

TABLE A

| Run No. | 1 | 2 | 3 |
|---|---|---|---|
| DMAC vapor rate | 50 cm$^3$/min* | 75 cm$^3$/min* | 100 cm$^3$/min* |
| DMAC vapor temp. | 110° C. | 107° C. | 112° C. |
| Slurry rate | 50 cm$^3$/min | 50 cm$^3$/min | 100 cm$^3$/min |
| Separator temp. | 105° C. | 99° C. | 92° C. |
| Polymer in treated slurry | 25.2 wt. % | 26.5 wt. % | 25.5 wt. % |
| Monomer in treated slurry | 1.3 wt. % | 1.4 wt. % | 2.9 wt. % |

*amount in liquid form prior to vaporization

COMPARATIVE EXAMPLE II

Comparative Example I was repeated using a separator pressure of 150 mm Hg absolute. The results of three runs are shown in Table B.

TABLE B

| Run No. | 4 | 5 | 6 |
|---|---|---|---|
| DMAC vapor rate | 50 cm$^3$/min* | 75 cm$^3$/min* | 100 cm$^3$/min* |
| DMAC vapor temp. | 113° C. | 109° C. | 112° C. |
| Slurry rate | 50 cm$^3$/min | 50 cm$^3$/min | 100 cm$^3$/min |
| Separator temp. | 103° C. | 106° C. | 101° C. |
| Polymer in treated slurry | 24.4 wt. % | 24.7 wt. % | 25.3 wt. % |
| Monomer in treated slurry | 3.2 wt. % | 2.5 wt. % | 2.9 wt. % |

*amount in liquid form prior to vaporization

In both Examples I and II it will be seen that a significant amount of unreacted monomer remains in the spinning solution after it has passed through the evaporator. These amounts, 1.3-3.2 weight percent, are too high for practical operation.

EXAMPLE III

A copolymer of 93 weight percent acrylonitrile and 7 weight percent vinyl acetate was produced in a conventional reactor using a known bulk polymerization process. Conversion was 37.7 percent and the composition of the slurry fed from the reactor to the tank 14 was as follows:

| Polymer solids | 37.7 wt. % |
|---|---|
| Acrylonitrile monomer | 48.0 wt. % |
| Vinyl acetate monomer | 14.3 wt. % |
| Total | 100.0% |

The reactor slurry, fed at a rate of 95.6 gm/min, was mixed with DMAC, fed at a rate of 54.7 gm/min, in the tank 14 to form the feed slurry for the monomer stripping units. The slurry, which was heated to 50° C. in the tank 14 and fed to the mixer 22 at 150.3 gm/min, had the following composition and feed rates:

| Polymer | 36.1 gm/min | 24.0 wt. % |
|---|---|---|
| Acrylonitrile monomer | 45.9 gm/min | 30.5 wt. % |
| Vinyl acetate monomer | 13.6 gm/min | 9.1 wt. % |
| DMAC | 54.7 gm/min | 36.4 wt. % |
| Total | 150.3 gm/min | 100.0% |

The slurry was contacted with hot solvent vapors from the second stage separator 28 in the mixer 22. The polymer solution was separated from the DMAC/monomer vapors in a 15 cm I.D. cyclone separator. Flow rates and processing conditions for the first stage monomer stripping operation was as follows:

Slurry feed flow rate: 150.3 gm/min
Slurry feed temperature: 50° C.
First stage separator pressure: 100 mm Hg
First stage separator temperature: 103° C.
$\Delta P$ across mixer 22: 70 mm Hg The solution from the first stage separator 23 was pumped to the second stage mixer 26 and mixed with DMAC vapor fed from the source at a rate of 426.5 gm/min, a solvent to solution ratio of 2.84. The solution and DMAC vapors were thoroughly mixed in the mixer 26. The final polymer solution was separated from the DMAC/monomer vapors in a 15 cm I.D. cyclone separator. The DMAC/monomer vapors were recycled to the first stage mixer 22. The flow rates and process conditions for the second stage were as follows:

DMAC vapor flow rate: 426.5 gm/min
DMAC vapor temperature: 135°-150° C.
DMAC vapor pressure: 260 mm Hg
Second stage separator pressure: 170 mm Hg
Second stage separator temperature: 116° C.
ΔP across second stage mixer: 90 mm Hg
Slurry polymer content: 19.0 wt.%
Slurry monomer content: 0.13 wt.%

EXAMPLE IV

A copolymer of 93 weight percent acrylonitrile and 7 weight percent vinyl acetate was produced in a conventional reactor using a known bulk polymerization process. Conversion was 39.6 percent and the composition of the slurry from the reactor was as follows:

| Polymer solids | 39.6 wt. % |
|---|---|
| Acrylonitrile monomer | 46.2 wt. % |
| Vinyl acetate monomer | 14.2 wt. % |
| | Total 100.0% |

The reactor slurry, fed at a rate of 115.3 gm/min, was mixed with DMAC, fed at a rate of 62.5 gm/min, in the tank 14 to form the feed slurry for the monomer stripping units. The slurry, heated to 50° C. in the tank 14, was fed to the mixer 22 and had the composition and feed rates:

| Polymer solids | 45.7 gm/min | 25.9 wt. % |
|---|---|---|
| Acrylonitrile monomer | 52.3 gm/min | 29.6 wt. % |
| Vinyl acetate monomer | 16.3 gm/min | 9.2 wt. % |
| DMAC | 62.3 gm/min | 35.3 wt. % |
| Total | 176.6 gm/min | 100.0% |

The polymer solution was separated from the DMAC/monomer vapors in a 15 cm I.D. cyclone separator. Flow rates and processing conditions for the first stage monomer stripping operation was as follows:

Slurry feed flow rate: 176.6 gm/min
Slurry feed temperature: 50° C.
First stage separator pressure: 100 mm Hg
First stage separator temperature: 103° C.
ΔP across first stage mixer 22: 70 mm Hg The solution from the first stage separator 23 was pumped to the second stage mixer 26 and mixed with DMAC vapor fed at a rate of 380 gm/min, or solvent to slurry ratio of 2.15. The final spinning dope was separated from the DMAC/monomer vapors in a 15 cm I.D. cyclone separator. The DMAC/monomer vapors were recycled to the first stage mixer 22. The flow rates and process conditions for the second stage were as follows:

DMAC vapor flow rate: 380 gm/min
DMAC vapor temperature: 135°-150° C.
DMAC vapor pressure: 260 mm Hg
Second stage separator pressure: 170 mm Hg
Second stage separator temperature: 116° C.
ΔP across second stage mixer: 90 mm Hg
Final solution polymer content: 17.4 wt.%
Final solution monomer content: 0.11 wt.%

EXAMPLE V

A copolymer of 93 weight percent acrylonitrile and 7 weight percent vinyl acetate was produced in a conventional reactor using a known bulk polymerization process. Conversion was 40.1 percent and the composition of the slurry from the reactor was as follows:

| Polymer solids | 40.1 wt. % |
|---|---|
| Acrylonitrile monomer | 45.8 wt. % |
| Vinyl acetate monomer | 14.1 wt. % |
| | Total 100.0% |

The reactor slurry, fed at a rate of 115.3 gm/min, was mixed with DMAC, fed at a rate of 62.5 gm/min, in the tank 14 to form the feed slurry for the monomer stripping units. The flow rates and composition fed to the mixer 22 were as follows, the slurry having been heated to 50° C. in the tank 14:

| Polymer | 46.2 gm/min | 26.0 wt. % |
|---|---|---|
| Acrylonitrile monomer | 52.8 gm/min | 29.7 wt. % |
| Vinyl acetate monomer | 16.3 gm/min | 9.2 wt. % |
| DMAC | 62.3 gm/min | 35.1 wt. % |
| Total | 177.6 gm/min | 100.0% |

After passing through the mixer, the polymer solution was separated from the DMAC/monomer vapors in a 15 cm I.D. cyclone separator. Flow rates and processing conditions for the first stage monomer stripping operation was as follows:

Slurry feed flow rate: 177.6 gm/min
Slurry feed temperature: 50° C.
First stage separator pressure: 100 mg Hg
First stage separator temperature: 103° C.
ΔP across mixer 22: 70 mm Hg The solution from the first stage separator 23 was pumped to the second stage mixer 26 and mixed with DMAC vapor fed at a rate of 324.5 gm/min, a solvent to slurry ratio of 1.83. The solution and DMAC vapors were mixed in the mixer 26. The final spinning dope was separated from the DMAC/monomer vapors in a 15 cm I.D. cyclone separator. The DMAC/monomer vapors were recycled to the first stage mixer 22. The flow rates and process conditions for the second stage were as follows:

DMAC vapor flow rate: 324.5 gm/min
DMAC vapor temperature: 135°-150° C.
DMAC vapor pressure: 260 mm Hg
Second stage separator pressure: 170 mm Hg
Second stage separator temperature: 116° C.
ΔP across second stage mixer: 90 mm Hg
Dope polymer content: 17.5 wt.%
Dope monomer content: 0.11 wt.%

EXAMPLE VI

A copolymer of 93 weight percent acrylonitrile and 7 weight percent vinyl acetate was produced in a conventional reactor using a known bulk polymerization process. Conversion was 39.0 percent and the composition of the slurry from the reactor was as follows:

| Polymer solids | 39.0 wt. % |
|---|---|
| Acrylonitrile monomer | 46.8 wt. % |

-continued

| Vinyl acetate monomer | 14.2 wt. % |
|---|---|
| Total | 100.0% |

The reactor slurry, fed at a rate of 95.6 gm/min, was mixed with DMAC, fed at a rate of 54.7 gm/min, in the tank 14 to form the feed slurry for the monomer stripping units. The slurry feed flow rates and compositions to the mixer 22 were as follows, the slurry having heated to 50° C. in the tank 14:

| Polymer | 36.1 gm/min | 24.0 wt. % |
|---|---|---|
| Acrylonitrile monomer | 45.9 gm/min | 30.5 wt. % |
| Vinyl acetate monomer | 13.6 gm/min | 9.1 wt. % |
| DMAC | 54.7 gm/min | 36.4 wt. % |
| Total | 150.3 gm/min | 100.0% |

After being mixed, the polymer solution was separated from the DMAC/monomer vapors in a 15 cm I.D. cyclone separator. Flow rates and processing conditions for the first stage monomer stripping operation was as follows:
Slurry feed flow rate: 150.3 gm/min
Slurry feed temperature: 50° C.
First stage separator pressure: 150 mm Hg
First stage separator temperature: 103° C.
ΔP across mixer 22: 70 mm Hg The solution from the first stage separator 23 was pumped to the second stage mixer 26 and mixed with DMAC vapor fed at a rate of 300.7 gm/min, a solvent to slurry ratio of 2.0. The final spinning dope was separated from the DMAC/monomer vapors in a 15 cm I.D. cyclone separator, with the DMAC/monomer vapors being recycled to the first stage mixer 22. The flow rates and process conditions for the second stage were as follows:
DMAC vapor flow rate: 300.7 gm/min
DMAC vapor temperature: 150° C.
DMAC vapor pressure: 260 mm Hg
Second stage separator pressure: 170 mm Hg
Second stage separator temperature: 116° C.
ΔP across second stage mixer: 90 mm Hg
Dope polymer content: 21.5 wt.%
Dope monomer content: 0.18 wt.%

EXAMPLE VII

A bulk polymerization reaction was carried out in the reactor 11 to produce a copolymer of 93% acrylonitrile and 7% vinyl acetate in a well known manner. The resulting polymerization slurry was diluted with dimethylacetamide from the supply 16 to produce in the tank 14 a slurry having 24.8 weight percent solids, 40.6 weight percent unreacted monomers and 33.7 weight percent of dimethylacetamide. This slurry, at a temperature of about 50° C., was fed at a rate of 40.8 kg per hour into the mixer 22. Vaporized solvent containing a small amount of unreacted monomers was fed from the separator 28 through line 35 into the mixer 22 at a rate of 358.1 kg per hour, so that the ratio of solvent to slurry fed into the mixer 22 was 0.88.

The mixture from the mixer 22 was fed into the separator 23, with the vapors from the separator 23 being forwarded to the monomer recovery unit and the remaining solution being fed to the mixer 26. The solution being fed to the mixer 26 was fed at a rate of 400.6 kg per hour and contained 25.31 weight percent of solids and 1.92 weight percent of unreacted monomers in solvent. Fresh dimethylacetamide from the supply 30 was fed into the mixer 26 at a rate of 457.8 kg per hour, so that the ratio of solvent to solution being fed to the mixer 26 was 1.14. The ratio of solvent fed to the mixer 26 to the slurry fed to the mixer 22 was 1.28.

The mixture leaving the mixer 26 was fed through line 27 into the separator 28, with the vapors from the separator 28 being fed back to the first stage mixer 22 and the liquid portion being carried off through line 31 to the spinning machine 32. The solution passing through the line 31 contained 24.39 weight percent solids and 0.13 weight percent unreacted monomers in dimethylacetamide. The amount of solution passing through the line 31 was 409 kg per hour.

A number of other runs were made under the conditions of Example VII. The amount of unreacted monomers passing through the line 31 ranged from 0.12 weight percent up to 0.26 weight percent, with the average being 0.165 weight percent.

The ratio of solvent to slurry or solution entering the mixers 22 and 26 is preferably about 0.8 to 1.2 In other words, for a given amount of slurry entering the mixer 22 or solution entering 26, 80 to 120 percent of that amount will, preferably, be the amount of solvent fed to the mixer. However, amounts of solvent up to 3 to 4 times the amount of slurry or solution can be used, as other examples will show.

For the purpose of determining flow rate ratios, it is preferably to measure the flow rate of solvent from the source 30 to the mixer 26 and compare that to the flow rate of slurry being fed from the tank 14 to the mixer 22. It is not necessary to measure solvent input to the mixer 22 or solution input to the mixer 26, since these values will be controlled by solvent input to the mixer 26 and slurry input to the mixer 22. The ratio of solvent fed from the source 30 to the mixer 26 to the slurry fed from the tank 14 to the mixer 22 should be about 0.8 to 4. It is preferably about 0.8 to 1.2.

What is claimed is:

1. The method of recovering unreacted mono-olefinic monomers from an acrylonitrile bulk polymerization slurry containing 30 to 50 weight percent of polymer solids and 70 to 50 weight percent of unreacted mono-olefinic monomers, comprising:
   a. diluting the slurry with a sufficient amount of a solvent selected from the group consisting of dimethylacetamide and dimethylsulfoxide to reduce the solids content of the diluted slurry to 20 to 25 weight percent.
   b. passing the diluted slurry through first and second treatment zones in series, each of said treatment zones having a first stage for mixing the slurry with a solvent in vapor form and a second stage for separating vapors from the polymer solution formed from the slurry in the first stage.
   c. supplying to the mixing stage of the second treatment zone a solvent selected from the group consisting of dimethylacetamide, dimethylformamide and dimethylsulfoxide, said solvent being in vapor form at a temperature in the range of 115° to 150° C. and being fed at a rate of 0.8 to 4 times the rate at which slurry is fed to the first treatment zone.
   d. separating solvent and unreacted vapors from the polymer solution in the second stage of the second treatment zone.
   e. supplying the mixing stage of the first treatment zone with the vaporized solvent and unreacted monomers from the second stage of the second zone to vaporize a portion of the unreacted monomers in the slurry entering the first treatment zone, and f. separating said vaporized solvent and unreacted monomers from the polymer solution in the separation stage of the first treatment zone.

2. The method of claim 1 wherein the slurry is heated to about 50° C. prior to being fed to said first mixer.

3. The method of claim 1 wherein the polymer solution leaving the separation stage of the second treatment zone contains less than 1.0 weight percent of unreacted monomers.

4. The method of claim 2 wherein the polymer solution leaving the separation stage of the first treatment zone contains less than about 50 weight percent unreacted monomers.

5. The method of claim 3 wherein the solvent is dimethylacetamide.

* * * * *